(No Model.)
J. BOLTON.
SEWING MACHINE.
No. 376,285. Patented Jan. 10, 1888.
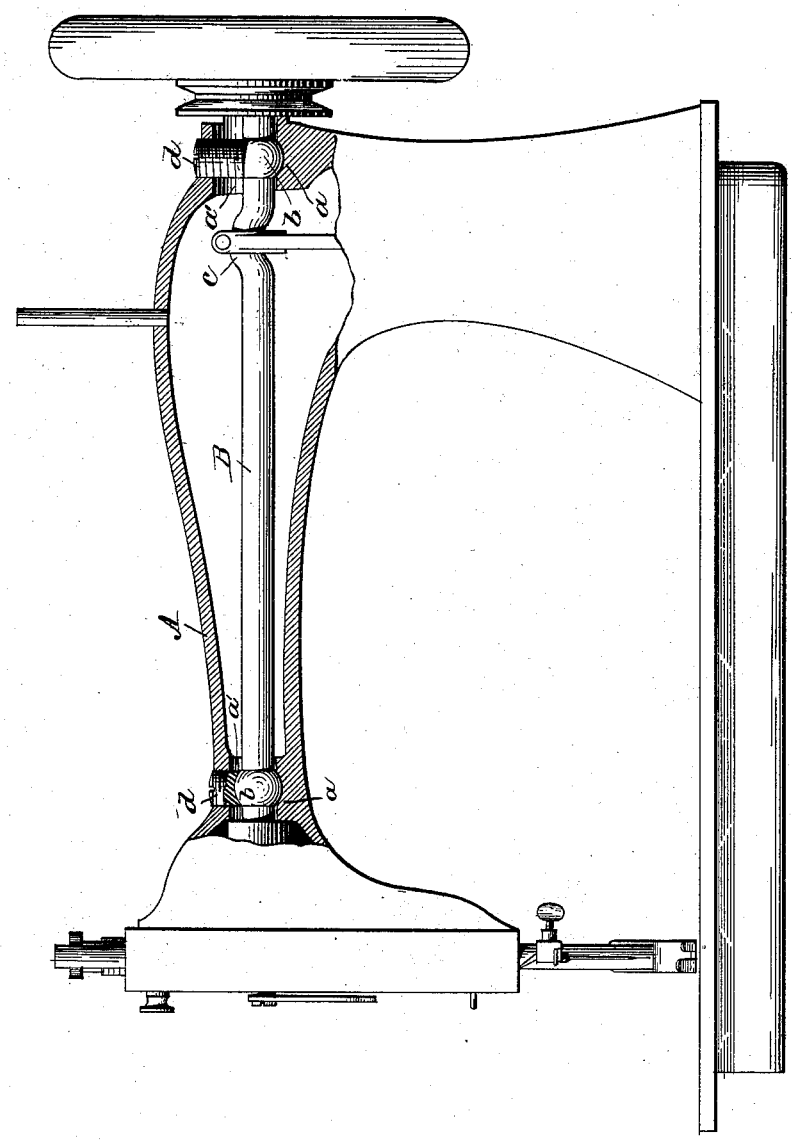
Witnesses
E. D. Smith
H. I. Curry
Inventor
James Bolton
by Henry Calver
Atty

UNITED STATES PATENT OFFICE.

JAMES BOLTON, OF NEW YORK, N. Y.

SEWING-MACHINE.

SPECIFICATION forming part of Letters Patent No. 376,285, dated January 10, 1888.

Application filed December 1, 1887. Serial No. 256,685. (No model.)

*To all whom it may concern:*

Be it known that I, JAMES BOLTON, a citizen of the United States, residing at New York, in the county of New York and State of New York, have invented certain new and useful Improvements in Sewing-Machines, of which the following is a specification, reference being had therein to the accompanying drawing.

The object of my invention is to provide a cheap and convenient construction of parts whereby a driving-shaft journaled in the upper part of the bracket-arm of a sewing-machine may be so held in its bearings that endwise movement of the shaft will be prevented and any wear occurring at the said bearings may be readily taken up or compensated for, the construction of the arm being such that the shaft with its crank (if it be formed with the latter) may be passed endwise through the arm to its operative position. To accomplish this object I provide the shaft with spherical or ball journals near its opposite ends and form concave bearings in the arm for the reception of the said spherical journals, which are held to the said bearings by screws having concave ends to fit over the said journals. To enable the shaft with its spherical journals (which are of larger diameter than the shaft) to be passed endwise to its place, the openings in the bearing-portions of the arm are formed of sufficient size to permit of the passage of the said journals; and if the shaft be provided with a crank one or both of the said openings will also be of sufficient size to permit of the passage of the said crank as the shaft is passed endwise to its place.

In the accompanying drawing, which is a sectional elevation of a sewing-machine embodying my invention, A denotes the bracket-arm, and B the driving-shaft, having near its opposite ends the spherical or ball journals $b$, and being also (in the present instance) provided with the crank $c$. The bearing portions $a$ of the arm are formed with concave seats for the reception of the ball-journals $b$, the said journals being held in their seats by bearing-screws $d$, tapped in the arm and provided with concave lower ends to fit the said journals. The openings $a'$ in the bearing portions of the arm are sufficiently large to enable the shaft B, with its enlarged ball-journals, to be passed endwise through the arm to its place, and if the said shaft be provided with a crank, as $c$, one or both of said openings will be large enough to permit of the passage of the crank also. In the present instance the rear opening is intended for this passage of the crank.

From the foregoing it will be apparent that when the shaft, with its ball-journals, has been placed in position, as described, it will be securely held to its bearings without the possibility of endwise movement by the bearing-screws $d$, which may be turned in, when necessary, to take up any wear of the journals occasioned by use.

I claim—

In a sewing-machine, the combination, with the bracket-arm having concave bearings, and a driving-shaft having near its opposite ends spherical or ball journals of greater diameter than the said shaft, of bearing-screws having concave ends fitting the said journals, the openings in said arm in which said shaft is journaled being sufficiently large to permit the shaft, with its enlarged spherical journals, to be passed endwise through the same, as set forth.

In testimony whereof I affix my signature in presence of two witnesses.

JAMES BOLTON.

Witnesses:
HENRY CALVER,
EWELL A. DICK.